United States Patent
Lee et al.

(10) Patent No.: US 12,514,134 B2
(45) Date of Patent: Dec. 30, 2025

(54) SPIN-ORBIT-TORQUE BASED MAGNETIC SENSOR AND A MAGNETIC FIELD MEASUREMENT METHOD USING A MAGNETIC SENSOR

(71) Applicants: HYUNDAI MOTOR COMPANY, Seoul (KR); KIA CORPORATION, Seoul (KR); IUCF-HYU (Industry-University Cooperation Foundation Hanyang University), Seoul (KR)

(72) Inventors: Ji-Sung Lee, Suwon-si (KR); Su-Jung Noh, Seoul (KR); Han-Saem Lee, Seoul (KR); Joon-Hyun Kwon, Hwaseong-si (KR); Jeong-Woo Seo, Seoul (KR); Jeong-Hun Shin, Seoul (KR); Jin-Pyo Hong, Seoul (KR)

(73) Assignees: HYUNDAI MOTOR COMPANY, Seoul (KR); KIA CORPORATION, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 686 days.

(21) Appl. No.: 17/842,017

(22) Filed: Jun. 16, 2022

(65) Prior Publication Data
US 2023/0320233 A1    Oct. 5, 2023

(30) Foreign Application Priority Data
Mar. 29, 2022  (KR) .................. 10-2022-0038735

(51) Int. Cl.
*H10N 52/80* (2023.01)
*H10N 52/00* (2023.01)
*H10N 52/01* (2023.01)

(52) U.S. Cl.
CPC ............. *H10N 52/80* (2023.02); *H10N 52/00* (2023.02); *H10N 52/01* (2023.02)

(58) Field of Classification Search
CPC ........ H10N 50/80; H10N 50/85; H10N 52/00; H10N 52/01; H10N 52/80; G01R 15/205; G01R 19/14; G01R 33/0005; G01R 33/09
See application file for complete search history.

(56) References Cited

U.S. PATENT DOCUMENTS

| 8,431,255 B2 | 4/2013 | Sarbanoo et al. |
| 11,022,662 B2 | 6/2021 | Hong et al. |
| 11,094,338 B1 | 8/2021 | Hwang et al. |

(Continued)

FOREIGN PATENT DOCUMENTS

| CN | 112082579 A | 12/2020 |
| JP | 2009158789 A | 7/2009 |

(Continued)

*Primary Examiner* — Nelson Garces
(74) *Attorney, Agent, or Firm* — Lempia Summerfield Katz LLC (57) ABSTRACT

A spin-orbit-torque (SOT)-based magnetic sensor is provided. The magnetic sensor includes a substrate, an electrode layer formed on the substrate, and a pair of first and second sensing elements stacked on the substrate so as to be connected to the electrode layer, wherein directions of respective currents flowing through the first and second sensing elements via the electrode layer are opposite to each other.

9 Claims, 5 Drawing Sheets

(56) References Cited

U.S. PATENT DOCUMENTS

2009/0176129 A1    7/2009  Sarbanoo et al.
2019/0088858 A1*   3/2019  Ohsawa ................ H10N 50/01

FOREIGN PATENT DOCUMENTS

| JP | 4696455 B2 | 3/2011 |
| KR | 101541992 B1 | 8/2015 |
| KR | 20200065678 A | 6/2020 |

* cited by examiner

SPIN-ORBIT-TORQUE BASED MAGNETIC SENSOR AND A MAGNETIC FIELD MEASUREMENT METHOD USING A MAGNETIC SENSOR

CROSS-REFERENCE TO RELATED APPLICATION

This application claims priority to and the benefit of Korean Patent Application No. 10-2022-0038735, filed on Mar. 29, 2022, the contents of which are incorporated herein by reference in its entirety.

BACKGROUND

Field

The present disclosure relates to a magnetic sensor based on spin-orbit-torque properties and a magnetic field measurement method using the same.

Description of Related Art

A magnetic sensor is a device that detects a change in an applied magnetic field and converts the change into an electrical signal. An example of a currently commercialized and widely used magnetic sensor includes a Hall sensor. A Hall sensor is a device that converts a change in a magnetic field passing through a cross-shaped metal layer into a voltage difference, and is recently used in an image-stabilization function of a smartphone camera.

In addition to the Hall sensor, as a sensor capable of measuring a magnetic field, there is a magnetoresistance sensor using magnetoresistance. A sensor using the magnetoresistance effect uses a phenomenon in which the electrical resistance of a material constituting the sensor changes depending on the presence or absence of a magnetic field. The magnetoresistance sensor uses anisotropic magnetoresistance (AMR), giant magneto-resistance (GMR), or tunneling magneto-resistance (TMR). The magnetoresistance sensor has an advantage of having at least 10 times the sensitivity compared to the conventional Hall sensor even if any operating principle is used.

The anisotropic magnetoresistance phenomenon is an effect that appears in ferromagnetic metals and alloys thereof, and is known as an additional effect other than the normal magnetoresistance effect. This occurs depending on the easy magnetization axis of a ferromagnetic material, and the angle between an external magnetic field and the current due to a spin-orbit interaction, and is known to have relatively low sensitivity.

A giant magnetoresistance phenomenon is a phenomenon in which the electric resistance of two magnetic layers is greatly different when the magnetic directions of the two magnetic layers are parallel and anti-parallel. This is implemented through a multi-layer structure, in which a conductor layer is formed between two magnetic thin layers. In the two magnetic thin layers, a layer having a fixed magnetization direction is provided, and when the magnetization direction of the magnetic thin layers is reversed, maximum resistance appears.

Figure 1:
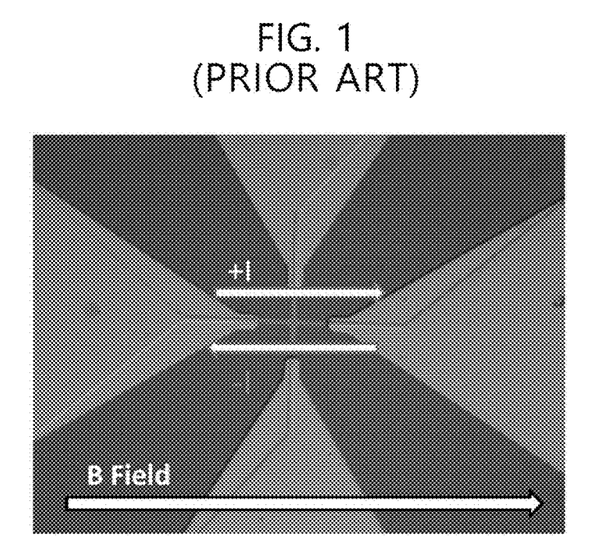
FIG. 1 illustrates an example of a conventional magnetic sensor.

The conventional spin-orbit-torque (SOT)-based magnetic sensor as illustrated in FIG. 1 is basically composed of a single sensing layer in a cross bar array.

The sensing layer is designed to be used as a magnetic sensor such that when a current is applied through an electrode in the same direction as a magnetic field that is being applied in a specific direction, the sensing layer measures a Hall voltage $V_H$ (+). And when a magnetic field or a current is being applied in the opposite direction, the sensing layer measures a Hall voltage $V_H$ (−), whereby a difference between the two Hall voltages, i.e., $\Delta V = V_{H(+)} - V_{H(-)}$ is calculated.

The disadvantage of this structure is that, since the single sensing layer is used so that $V_{H(+)}$ and $V_{H(-)}$ are individually measured, the circuit design becomes complicated.

When a sensor is fabricated with a single element, the single element should be measured in two modes, i.e., DC/AC modes, for its adaptation to a sensor. In case of using the AC mode, there is a disadvantage in that a rock-in amplifier is additionally required on a circuit to measure a voltage. In addition, in case of using the DC mode, two pieces of data about a flowing-to-right current (or a right-side current) and a flowing-to left current (or a left-side current) are required to have the range and sensitivity of a magnetic field sensor currently used as shown. In this case, there is a problem in that power consumption is inevitably increased, since the current has to be sent twice.

We have found that the current method needs a logic circuit that calculates two voltage values associated with the right-side current and the left-side current.

As such, there is a problem in that both AC/DC modes need an additional circuit, which increases an area through device packaging.

The matters described in the background art are intended to help the understanding of the background of the present disclosure, and may include matters that are not already known to those of having ordinary skill in the art to which this technology belongs.

SUMMARY

The present disclosure has been devised to solve the above problems, and an objective of the present disclosure is to provide a spin-orbit-torque (SOT)-based magnetic sensor capable of effectively measuring a magnetic field without an addition of additional circuit component, an increased area, or increased power consumption, and a magnetic field measurement method using the magnetic sensor.

According to an aspect of the present disclosure, a spin-orbit-torque (SOT)-based magnetic sensor includes: a substrate, an electrode layer formed on the substrate, and a pair of first and second sensing elements stacked on the substrate so as to be connected to the electrode layer. In particular, directions of respective currents flowing through the first and second sensing elements via the electrode layer are opposite to each other.

Here, the direction of the current flowing through the first sensing element may be opposite to a direction of a magnetic field applied, and the direction of the current flowing through the second sensing element may be the same as a direction of a magnetic field applied.

In addition, the electrode layer may include: a first electrode part connected to a current source, and a pair of second electrode parts branching in opposite directions from the first electrode part so as to be connected to first ends of the first sensing element and the second sensing element, respectively. The electrode layer may further include: a pair of first sensing element-side third electrode parts connected to both lateral ends of the first sensing element and extending perpendicular to the second electrode parts, and a pair of second sensing element-side third electrode parts connected to both lateral ends of the second sensing element and extending perpendicular to the second electrode parts.

In addition, the electrode layer may further include a pair of fourth electrode parts connected between second ends of the first and second sensing elements, respectively, and a ground.

In one embodiment, each of the first sensing element and the second sensing element may include a heavy metal layer, a ferromagnetic layer, an oxide layer, and a capping layer sequentially stacked in the order.

In another embodiment, the current applied through the first electrode part may branch into a first sub-current flowing through the second electrode part connected to the first sensing element and a second sub-current flowing through the second electrode part connected to the second sensing element, whereby the first and second sub-currents flow through the first and second sensing elements in opposite directions.

In one embodiment, a voltage across the pair of first sensing element-side third electrode parts and a voltage across the pair of second sensing element-side third electrode parts may be simultaneously measured.

In another embodiment, the second electrode parts in the pair may be in facial contact with the first ends of the first and second sensing elements, respectively.

In addition, the second electrode parts in the pair may be in facial contact with the ferromagnetic metal layers of the first and second sensing elements, respectively.

In addition, the first sensing element-side third electrode parts in the pair may be in facial contact with both lateral ends of the first sensing element, and the second sensing element-side third electrode parts in the pair may be in facial contact with both lateral ends of the second sensing element.

According to another aspect of the present disclosure, a spin-orbit-torque (SOT)-based magnetic sensor includes: a substrate, an electrode layer formed on the substrate, and a pair of first and second sensing elements stacked on the substrate, wherein directions of respective currents flowing through the first and second sensing elements via the electrode layer are opposite to each other.

In addition, the direction of the current flowing through the first sensing element may be opposite to a direction of a magnetic field applied, and the direction of the current flowing through the second sensing element may be the same as a direction of a magnetic field applied.

In one embodiment, the electrode layer may include: a first electrode part connected to a current source, a pair of second electrode parts branching in opposite directions from the first electrode part, a pair of first sensing element-side third electrode parts extending in opposite directions perpendicular to a first sensing element-side second electrode part of the pair of second electrode parts, and a pair of second sensing element-side third electrode parts extending in opposite directions perpendicular to a second sensing element-side second electrode part of the pair of second electrode parts.

In another embodiment, each of the first sensing element and the second sensing element may include a heavy metal layer, a ferromagnetic layer, an oxide layer, and a capping layer sequentially stacked in the order.

In one embodiment, a voltage across the pair of first sensing element-side third electrode parts and a voltage across the pair of second sensing element-side third electrode parts may be simultaneously measured.

In one embodiment, the first sensing element may be stacked in a region where the first sensing element-side second electrode part and the pair of first sensing element-side third electrode parts intersect with each other, and the second sensing element may be stacked in a region where the second sensing element-side second electrode part and the pair of second sensing element-side third electrode parts intersect with each other According to a further aspect of the present disclosure, there is provided a method of measuring a magnetic field using a spin-orbit-torque (SOT)-based magnetic sensor. the method includes: a step of measuring a voltage across the pair of first sensing element-side third electrode parts and a voltage across the pair of second sensing element-side third electrode parts when a magnetic field is applied in one direction parallel to the second electrode part of the SOT-based magnetic sensor; and a step of calculating a difference in voltage between the pair of first sensing element-side third electrode parts and the pair of second sensing element-side third electrode parts.

According to the magnetic sensor of the present disclosure, there is an advantage in that the information desired for the existing sensor is provided with one current application and at the same time, calculation is performed through an analog circuit.

Nevertheless, an increased power consumption, an additional circuit configuration, or an increased area is not required for such efficiency.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

In order to fully understand objectives, operations, and effects and advantages of the present disclosure, a reference should be made to the accompanying drawings illustrating embodiments of the present disclosure and the contents described in the accompanying drawings.

In describing embodiments of the present disclosure, a description about known techniques or a repetitive description that may unnecessarily obscure the gist of the present disclosure is shortened or omitted.

When a component, device, element, or the like of the present disclosure is described as having a purpose or performing an operation, function, or the like, the component, device, or element should be considered herein as being "configured to" meet that purpose or to perform that operation or function.

Figure 2:
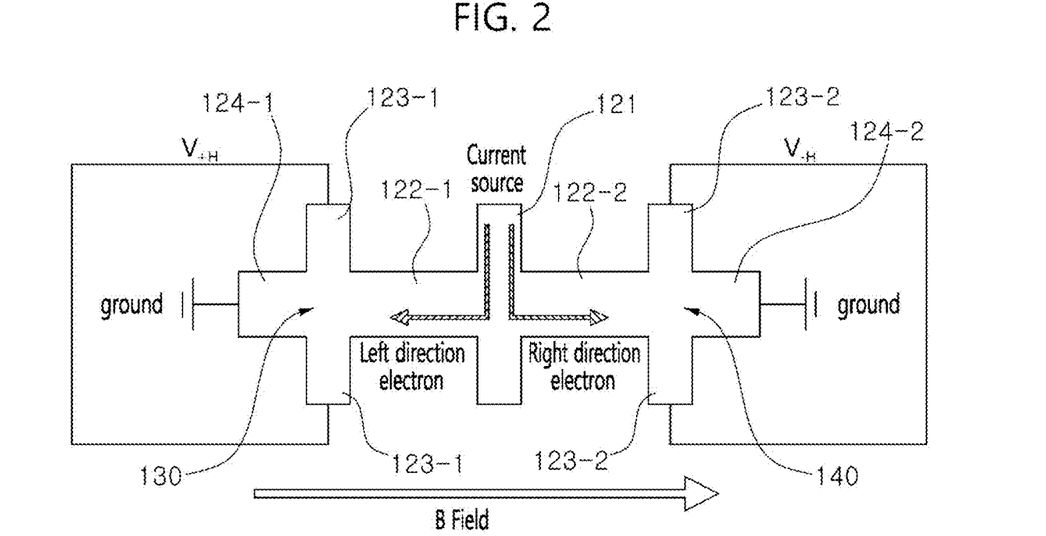
FIG. 2 schematically illustrates a magnetic sensor according to an embodiment of the present disclosure.
Figure 3:
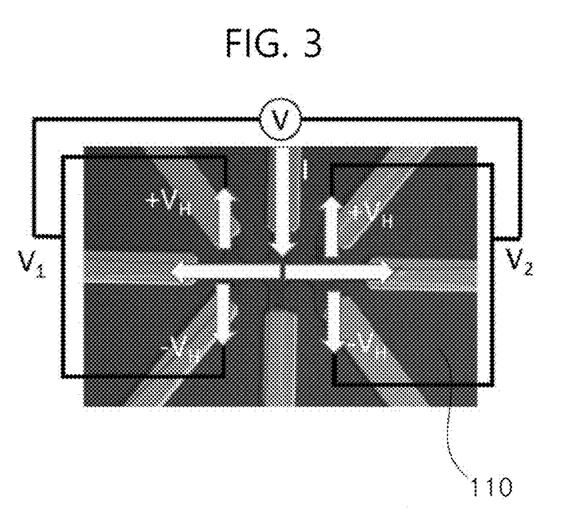
FIG. 3 illustrates a circuit configuration of the magnetic sensor according to the embodiment of the present disclosure.
Figure 4:
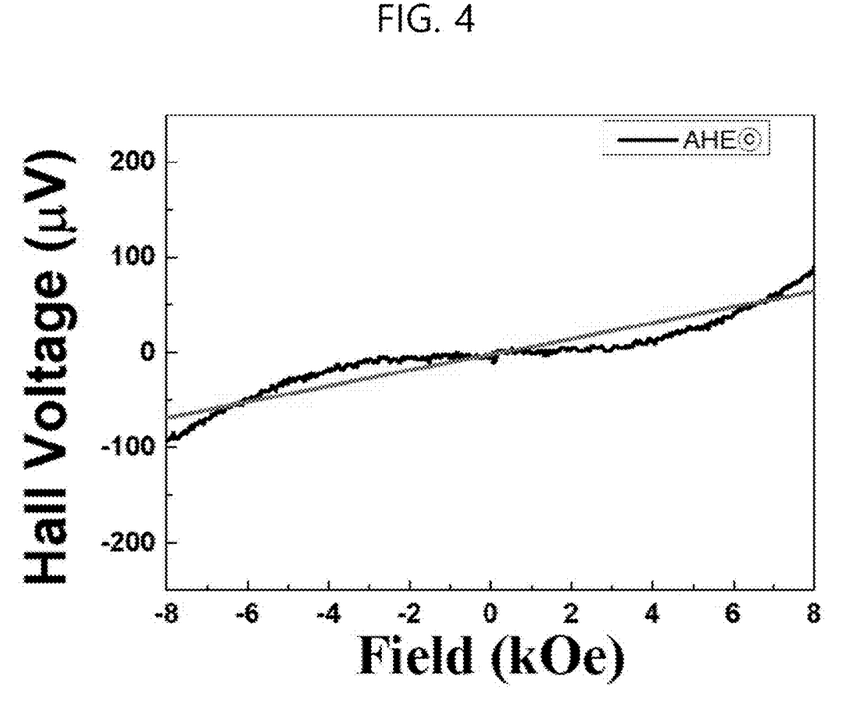
FIG. 4 illustrates measured Hall voltage.

FIG. 2 schematically illustrates a magnetic sensor according to an embodiment of the present disclosure, FIG. 3 illustrates a circuit configuration of the magnetic sensor according to the embodiment of the present disclosure, and FIG. 4 illustrates measured Hall voltage.

Hereinafter, a spin-orbit-torque (SOT)-based magnetic sensor and a magnetic field measurement method using the magnetic sensor according to the present disclosure are described with reference to FIGS. 2 to 4.

The present disclosure is directed to a magnetic sensor in which an electrode layer is formed on a substrate 110 and a sensing element is provided on the electrode layer or between the electrode layers to measure a voltage difference occurring due to a current flowing through the element in a state in which a magnetic field is applied, thereby sensing the magnetic field. Here, the magnetic sensor uses a sensing element based on spin-orbit-torque properties.

Unlike the conventional magnetic sensor having the same role as the magnetic sensor of the present disclosure, in which a current is applied to a single sensing element in opposite directions to measure respective corresponding voltages and calculate a voltage difference, the present disclosure is implemented such that a pair of sensing elements consisting of a first sensing element 130 and a second sensing element 140 is provided and a current is applied to the pair of sensing elements in opposite directions to measure Hall voltages of the both sensing elements with one current application and calculate a voltage difference at once.

In other words, as illustrated in FIGS. 2 to 5, instead of a single cross-shaped element, two cross-shaped elements are used to measure a Hall voltage while changing a voltage value in a manner as to combine two Hall voltages of the two cross-shaped elements. When measuring a voltage with direct current (DC) mode, in order to solve a problem of applying a current twice in different directions, cross structures are placed on both sides of the current point to make the current flow in different directions at once. A circuit that needs to be calculated in advance to measure two Hall voltages at once can be supplemented in an analog method.

Figure 5:
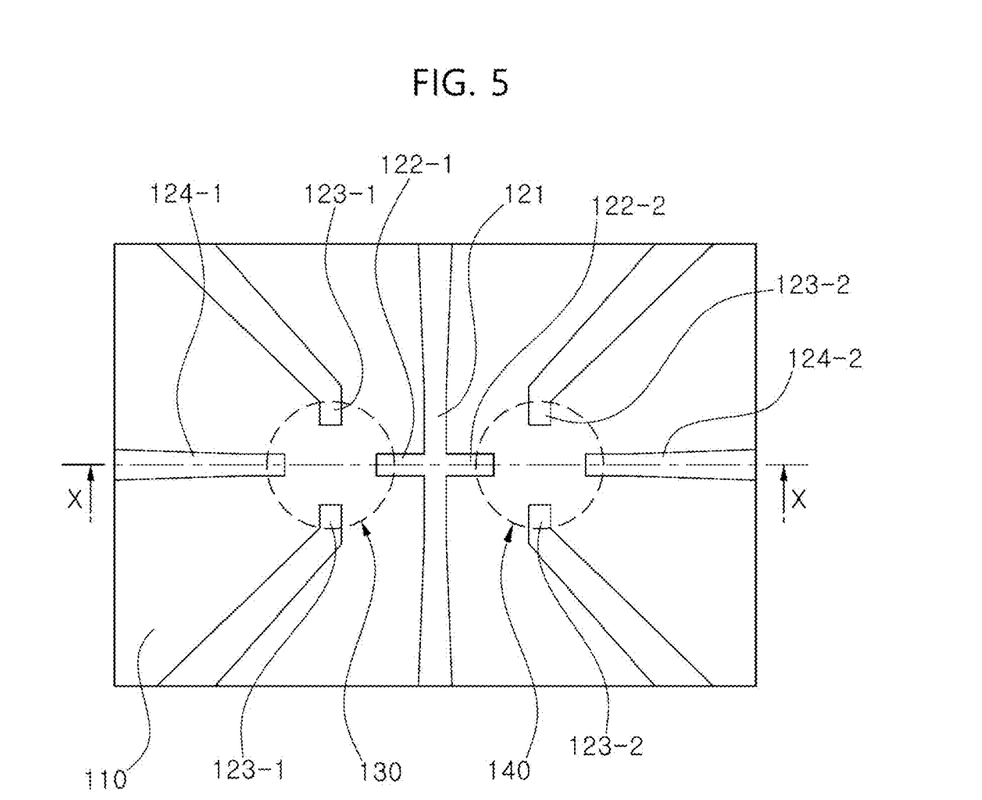
FIG. 5 illustrates a planar shape of a magnetic sensor according to a first embodiment of the present disclosure.
Figure 6:
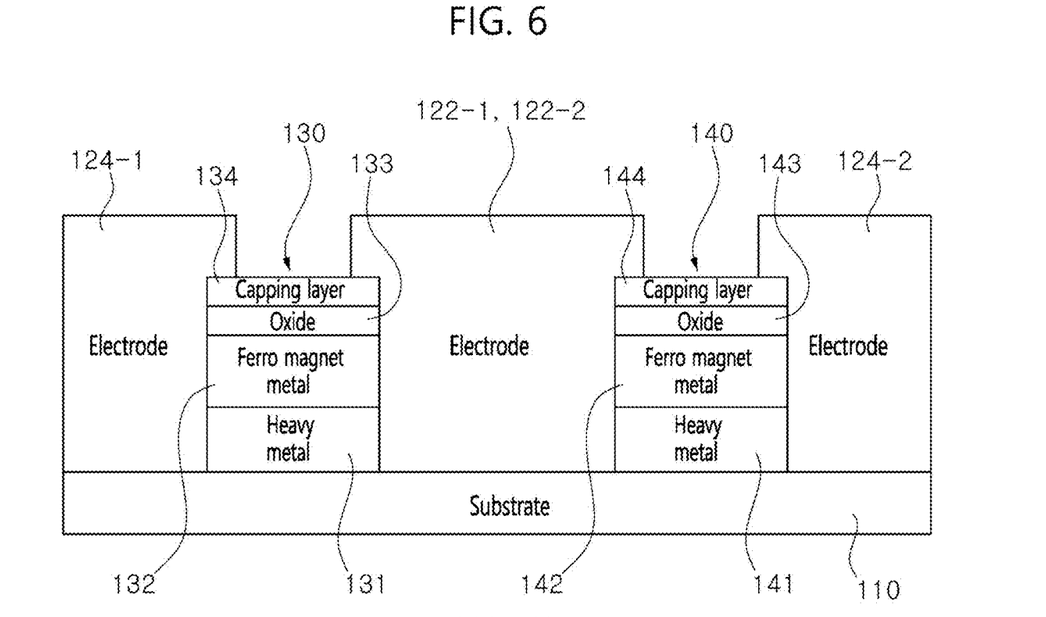
FIG. 6 illustrates a cross-sectional shape taken along a line of X-X of FIG. 5.

FIG. 5 illustrates a planar shape of a magnetic sensor according to a first embodiment of the present disclosure, and FIG. 6 illustrates a cross-sectional shape taken along a line of X-X of FIG. 5. Referring to FIG. 2 and FIGS. 5 to 6, the magnetic sensor according to the first embodiment of the present disclosure includes a substrate 110, an electrode layer, a first sensing element 130, and a second sensing element 140.

The electrode layer includes a first electrode part 121, a pair of second electrode parts 122-1 and 122-2, a pair of third electrode parts 123-1 and 123-2, and a pair of fourth electrode parts 124-1 and 124-2.

The first electrode part 121 is connected to a current source.

The second electrode parts 122-1 and 122-2 respectively branch in opposite directions to each other from the first electrode part 121. In one embodiment, the branch directions of the second electrode parts 122-1 and 122-2 are parallel to a direction of a magnetic field (B field).

The second electrode parts 122-1 and 122-2 branch from the first electrode part 121 and are connected to first ends of the first sensing element 130 and the second sensing element 140, respectively.

In addition, the fourth electrode parts 124-1 and 124-2 are connected between second ends of the first sensing element 130 and the second sensing element 140 and a ground in a direction, for example, a direction parallel to a direction of a magnetic field (B field).

In addition, a pair of first sensing element-side third electrode parts 123-1 is connected to both lateral ends of the first sensing element 130 and extends in a direction perpendicular to the second electrode part 122-1 and the fourth electrode parts 124-1. This extension direction is also perpendicular to the direction of the magnetic field (B field).

Similarly, a pair of second sensing element-side third electrode parts 123-2 is connected to both lateral ends of the second sensing element 140 and extends in a direction perpendicular to the second electrode part 122-2 and the fourth electrode parts 124-2. This extension direction is also perpendicular to the direction of the magnetic field (B field).

Each of the first sensing element 130 and the second sensing element 140 has a cell structure including a heavy metal layer 131, 141, a heavy metal layer, a ferromagnetic metal layer 132, 142, an oxide layer 133, 143, and a capping layer 134, 144 sequentially stacked in the order so that the cell structure has spin-orbit-torque properties.

The magnetic sensor of the present disclosure has the above configuration, so that a current applied from a current source through the first electrode part 121 branches through the pair of second electrode parts 122-1 and 122-2 into two sub-currents flowing through the first sensing element 130 and the second sensing element 140, respectively.

In the illustrated example, a direction of the current flowing through the first sensing element 130 is opposite to a direction of a magnetic field, and a direction of the current flowing through the second sensing element 140 is parallel to the direction of the magnetic field.

When a current flows through the first sensing element 130 and the second sensing element 140 in a state in which a magnetic field is applied in one direction as described above, a Hall voltage is generated so that a voltage $V_{+H}$ across the pair of first sensing element-side third electrode parts 123-1 connected to the first sensing element 130 and a voltage $V_{-H}$ across the pair of second sensing element-side third electrode parts 123-2 connected to the second sensing element 140 can be measured. Accordingly, a change in the magnitude and direction of the magnetic field can be detected by measuring a difference $\Delta V$ between $V_{+H}$ and $V_{-H}$ with the single current application.

The basic structure of the first embodiment in which an electrode may be put into a magnetic domain may be one of proposed solutions to reduce the effect of the magnetic domain at maximum. The advantage of this structure is that the entire area in which a sensing element operates is a magnetic domain area, so the sensitivity of a Hall sensor can be controlled in the magnetic domain.

This structure is different from other structures in the manufacturing process. The thin film sensing element structure of the heavy metal/ferromagnetic metal/oxide/capping layers is etched through ion-milling by stacking a mask in the form of a dotted line. Thereafter, the structure illustrated in FIGS. 8 and 9 is manufactured by stacking portions corresponding to the electrode layers.

This structure has an advantage in that the magnetic domain can be formed stably in an easy manner as to create and manipulate the same due to its increased area because the ferromagnetic material is present on the whole between the electrode and the electrode through which the current flows, which makes it possible to availably use the sensor.

Figure 7:
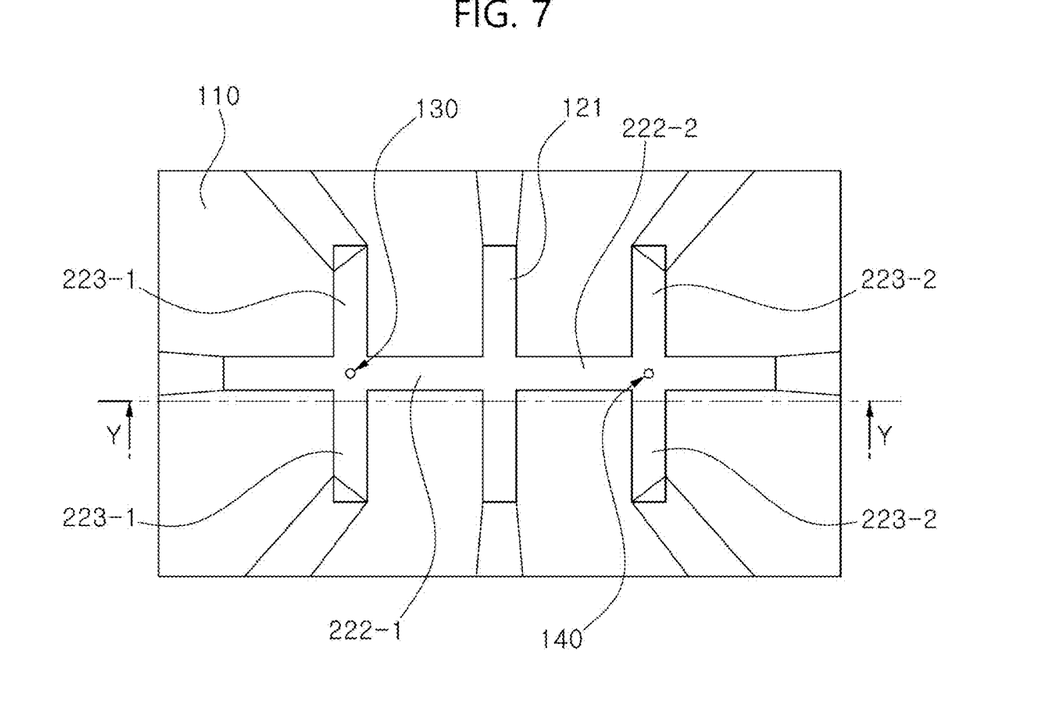
FIG. 7 illustrates a planar shape of a magnetic sensor according to a second embodiment of the present disclosure.
Figure 8:
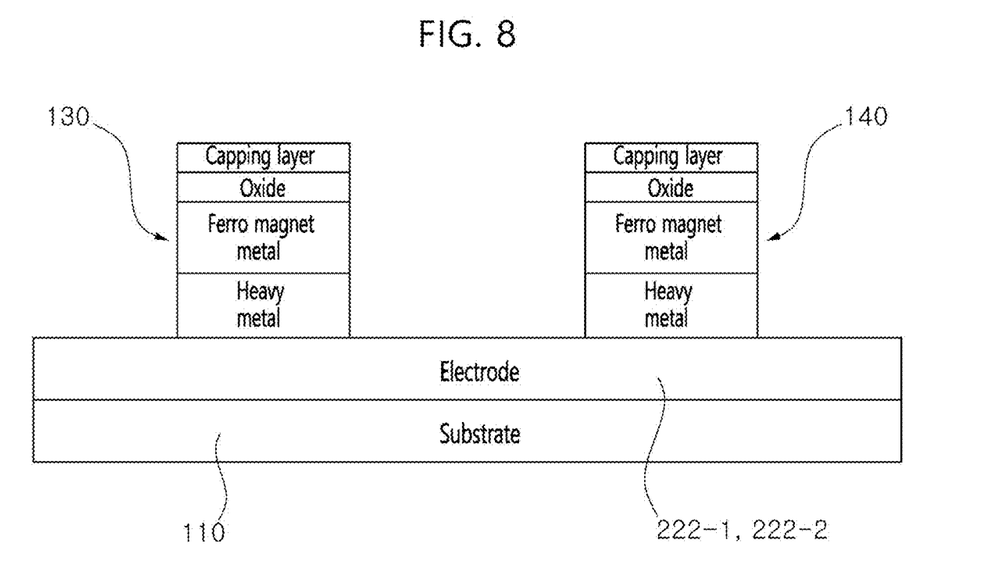
FIG. 8 illustrates a cross-sectional shape taken along a line Y-Y of FIG. 7.

FIG. 7 illustrates a planar shape of a magnetic sensor according to a second embodiment of the present disclosure, and FIG. 8 illustrates a cross-sectional shape taken along a line Y-Y of FIG. 7. Referring to FIG. 2 and FIGS. 7 to 8, the magnetic sensor according to the second embodiment of the present disclosure includes a substrate 110, an electrode layer, a first sensing element 130, and a second sensing element 140. A description of the same configuration as in the previous embodiment is omitted.

The electrode layer includes a first electrode part 121, a pair of second electrode parts 222-1 and 222-2, and a pair of third electrode parts 223-1 and 223-2.

The first electrode part 121 is connected to a current source.

The second electrode parts 222-1 and 222-2 respectively branch from the first electrode part 121 in opposite directions to each other. In one embodiment, the opposite directions are parallel to a direction of a magnetic field (B field).

Unlike the first embodiment, the pair of second electrode parts 222-1 and 222-2 branches from the first electrode part 121, and both ends thereof are connected to the ground.

In addition, a pair of first sensing element-side third electrode parts 223-1 is formed to extend in opposite directions perpendicular to the second electrode part 222-1 from the second electrode part 222-1 on the first sensing element 130 side. The extension direction is also perpendicular to the direction of the magnetic field (B field).

In addition, a pair of second sensing element-side third electrode parts 223-2 is formed to extend in opposite directions perpendicular to the second electrode part 222-2 from the second electrode part 222-2 on the second sensing element 140 side. The extension direction is also perpendicular to the direction of the magnetic field (B field).

Unlike the first embodiment, the first sensing element 130 and the second sensing element 140 are formed by being respectively stacked in regions where the second electrode part 222-1 and the first sensing element-side third electrode part 223-1, and the second electrode part 222-2 and the second sensing element-side third electrode part 223-2 intersect with each other.

Each of the first sensing element 130 and the second sensing element 140 has a cell structure including a heavy metal layer 131, 141, a ferromagnetic metal layer 132, 142, an oxide layer 133, 143, and a capping layer 134, 144 sequentially stacked in the order so that the cell structure has spin-orbit-torque properties.

Also in the magnetic sensor according to the second embodiment, a current applied from a current source through the first electrode part 121 branches through the pair of second electrode parts 222-1 and 222-2 into two sub-currents flowing through the first sensing element 130 and the second sensing element 140, respectively.

In the illustrated example, a direction of the current flowing through the first sensing element 130 is opposite to a direction of a magnetic field, and a direction of the current flowing through the second sensing element 140 is parallel to the direction of the magnetic field.

When a current flows through the first sensing element 130 and the second sensing element 140 in a state in which a magnetic field is applied in one direction as described above, a Hall voltage is generated so that a voltage $V_{+H}$ across the pair of first sensing element-side third electrode parts 223-1 connected to the first sensing element 130 and a voltage $V_{-H}$ across the pair of second sensing element-side third electrode parts 223-2 connected to the second sensing element 140 can be measured. Accordingly, a change in the magnitude and direction of the magnetic field can be detected by measuring a difference $\Delta V$ between $V_{+H}$ and $V_{-H}$ with the single current application.

The structure of the second embodiment is a structure in which a ferromagnetic metal layer is stacked on an electrode so that a magnetic domain area is reduced to reduce the influence of the domain. In the corresponding structure, the element characteristics of the first and second sensing elements may be similar to each other, and thus they are more effective in reducing the effect of the magnetic domain area.

The manufacturing process of the second embodiment structure can be simplified compared to that of the first embodiment structure because in the second embodiment structure, it is enough to first stack the electrode and then stack the circular ferromagnetic layer thereon.

As the magnetic domain area is small, the amount of power consumed to operate the sensing element is reduced, and effects, such as Dzyaloshinskii-Moriya interaction, caused by ferromagnetic materials, in addition to the spin-orbit-torque effect as mentioned above can be reduced, which can assist in increasing the accuracy of the sensor.

It is expected that the magnetic sensor of the present disclosure as described above can be available in various ways.

This technology belongs to the field of magnetic sensors. This technology are expected to be applicable to various applications such as conventional Hall sensors, magnetoresistance sensors, magnetic sensors, semiconductor devices, high-end industrial sensor applications, biomedical sensor applications, magnetic field precision measurements, ultra-precision speed and coordinate sensing, geomagnetic sensing, metal object detection, non-destructive testing (NDT), magnetic communication, and 3D magnetic imaging.

In addition, this technology can be applied as a shunt resistance current sensor used in autonomous electric vehicles. That is, compared to a Hall-current sensor having a large error and noise voltage, the shunt resistance current sensor of this structure can realize low noise.

Further, this technology can be applied to smartphone, game console, navigation, IoT, etc., to detect location, direction, movement, posture, etc., so that this technology can be applicable to key sensors to realize various functions, user interfaces such as pedestrian and vehicle navigation, black boxes, game consoles, smart phones, etc. and inertial and magnetic sensors that is a core technique of motion recognition parts, camera image-stabilization, remote controllers, flip covers, OIS, Auto-Focus, Pan/Tilt, geomagnetic sensors, and 9-axis smart motion sensors.

While the present disclosure as described above has been illustrated with reference to the drawings, the present disclosure is not limited to the described embodiments, and it is obvious to those of having ordinary skill in the art that various modifications and variations can be made without departing from the spirit and scope of the present disclosure. Therefore, such modifications or variations should be considered to belong to the scope of the present disclosure.

What is claimed is:

1. A spin-orbit-torque (SOT)-based magnetic sensor comprising:
   a substrate;
   an electrode layer formed on the substrate; and
   a pair of first and second sensing elements stacked on the substrate so as to be connected to the electrode layer, wherein directions of respective currents flowing through the first and second sensing elements via the electrode layer are opposite to each other,
   wherein the electrode layer comprises:
   a first electrode part connected to a current source;

a pair of second electrode parts branching in opposite directions from the first electrode part so as to be connected to first ends of the first sensing element and the second sensing element, respectively;

a pair of first sensing element-side third electrode parts connected to both lateral ends of the first sensing element and extending perpendicular to the second electrode parts; and a pair of second sensing element-side third electrode parts connected to both lateral ends of the second sensing element and extending perpendicular to the second electrode parts.

2. The SOT-based magnetic sensor of claim 1, wherein the direction of the current flowing through the first sensing element is opposite to a direction of a magnetic field applied, and the direction of the current flowing through the second sensing element is the same as the direction of the magnetic field applied.

3. The SOT-based magnetic sensor of claim 1, wherein the electrode layer further includes:

a pair of first sensing element-side third electrode parts connected to both lateral ends of the first sensing element and extending perpendicular to the second electrode parts;

a pair of second sensing element-side third electrode parts connected to both lateral ends of the second sensing element and extending perpendicular to the second electrode parts; and a pair of fourth electrode parts connected between second ends of the first and second sensing elements, respectively, and a ground.

4. The SOT-based magnetic sensor of claim 1, wherein each of the first sensing element and the second sensing element includes a heavy metal layer, a ferromagnetic layer, an oxide layer, and a capping layer sequentially stacked on one another.

5. The SOT-based magnetic sensor of claim 1, wherein the current applied through the first electrode part branches into a first sub-current flowing through the second electrode part connected to the first sensing element and a second sub-current flowing through the second electrode part connected to the second sensing element, whereby the first and second sub-currents flow through the first and second sensing elements in opposite directions.

6. The SOT-based magnetic sensor of claim 1, wherein the electrode layer further includes:

a pair of first sensing element-side third electrode parts connected to both lateral ends of the first sensing element and extending perpendicular to the second electrode parts; and a pair of second sensing element-side third electrode parts connected to both lateral ends of the second sensing element and extending perpendicular to the second electrode parts, wherein a voltage across the pair of first sensing element-side third electrode parts and a voltage across the pair of second sensing element-side third electrode parts are simultaneously measured.

7. The SOT-based magnetic sensor of claim 1, wherein the second electrode parts in the pair are in facial contact with the first ends of the first and second sensing elements, respectively.

8. The SOT-based magnetic sensor of claim 7, wherein the second electrode parts in the pair are in facial contact with ferromagnetic metal layers of the first and second sensing elements, respectively.

9. The SOT-based magnetic sensor of claim 7, wherein the electrode layer further includes:

a pair of first sensing element-side third electrode parts connected to both lateral ends of the first sensing element and extending perpendicular to the second electrode parts; and a pair of second sensing element-side third electrode parts connected to both lateral ends of the second sensing element and extending perpendicular to the second electrode parts, wherein the first sensing element-side third electrode parts in the pair are in facial contact with both lateral ends of the first sensing element, and the second sensing element-side third electrode parts in the pair are in facial contact with both lateral ends of the second sensing element.

* * * * *